(12) United States Patent
Brandt et al.

(10) Patent No.: US 7,930,455 B2
(45) Date of Patent: Apr. 19, 2011

(54) SYSTEM AND METHOD FOR SEPARATING AND COMMUNICATING INFORMATION-TYPE DATA AND SIGNAL-TYPE DATA

(75) Inventors: Wayne D. Brandt, Morton, IL (US); Travis O. Breitkreutz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 138 days.

(21) Appl. No.: 12/318,013

(22) Filed: Dec. 19, 2008

(65) Prior Publication Data

US 2010/0161859 A1    Jun. 24, 2010

(51) Int. Cl.
G06F 13/42 (2006.01)
(52) U.S. Cl. .......................... 710/105; 710/104; 709/230
(58) Field of Classification Search .......... 710/305–315, 710/8–12, 104–110; 709/230–240, 248–252
See application file for complete search history.

(56) References Cited

U.S. PATENT DOCUMENTS

| | | |
|---|---|---|
| 5,604,740 A | 2/1997 | Pinault et al. |
| 5,812,553 A | 9/1998 | Pinault et al. |
| 5,812,639 A | 9/1998 | Bartholomew et al. |
| 6,064,299 A | 5/2000 | Lesesky et al. |
| 6,084,870 A | 7/2000 | Wooten et al. |
| 6,330,225 B1 | 12/2001 | Weber et al. |
| 6,608,554 B2 | 8/2003 | Weant et al. |
| 6,738,701 B2 | 5/2004 | Wilson |
| 7,015,800 B2 | 3/2006 | Lesesky et al. |
| 7,040,435 B1 | 5/2006 | Lesesky et al. |
| 7,266,629 B2 * | 9/2007 | Honda ........................... 710/305 |
| 7,467,250 B2 * | 12/2008 | Honda ........................... 710/305 |
| 2003/0163587 A1 | 8/2003 | Knight et al. |
| 2005/0002417 A1 | 1/2005 | Kelly et al. |
| 2005/0004735 A1 | 1/2005 | Kelly et al. |
| 2005/0048958 A1 | 3/2005 | Mousseau et al. |
| 2005/0201411 A1 * | 9/2005 | Shibata et al. ................. 370/463 |
| 2006/0227710 A1 * | 10/2006 | Honda ........................... 370/235 |

* cited by examiner

*Primary Examiner* — Raymond N Phan
(74) *Attorney, Agent, or Firm* — Finnegan, Henderson, Farabow, Garrett & Dunner LLP

(57) ABSTRACT

A communication system is disclosed for communicating data among a plurality of electronic modules. The communication system may include a data type classifier configured to separate the data into information-type data and signal-type data. The communication system may further include a first communication stack configured to communicate the information-type data among the plurality of electronic modules. The communication system may also include a second communication stack configured to communicate the signal-type data among the plurality of electronic modules. The first communication stack and the second communication stack may share a physical data link.

25 Claims, 4 Drawing Sheets

SYSTEM AND METHOD FOR SEPARATING AND COMMUNICATING INFORMATION-TYPE DATA AND SIGNAL-TYPE DATA

TECHNICAL FIELD

This application relates to a system and method for communicating information among electronic modules, and more particularly, to a system and method for separating information and signal communications among electronic modules.

BACKGROUND

Machines such as, for example, wheel loaders, motor graders, track-type tractors, dump trucks, and other types of machinery are used to perform a variety of tasks associated with an industry such as, mining, construction, manufacturing, or transportation. In order to perform these tasks, a machine may include a plurality of systems and each system may have one or more controllers, such as electronic control units (ECUs) or electronic control modules (ECMs). For example, a modern vehicle may have as many as 50 such control units for various subsystems. The ECUs may form a controller network and may be in communication with each other via a data link and various data transmission protocols, such as controller area network (CAN) or FlexRay (that is currently under development).

A particular function performed by the machine may usually involve several ECUs. Accordingly, these several ECUs may communicate with each other to send and receive various types of data. Two common types of data transmitted in the controller network are information-type data and signal-type data. For example, control commands and large data files may be transmitted among various ECUs. Meanwhile, signals may also be transmitted among data monitoring devices (e.g., sensors) and ECUs, as well as among the ECUs. Because of the different characteristics of information data and signal data, communications of these two types of data have different performance requirements. For example, communication of information data emphasizes high portability and scalability, while communication of signal data emphasizes maximum fidelity and continuity. Therefore, there is a need to separate the communication of information and signal data into two stacks to satisfy the respective performance requirements.

An apparatus and method for vehicle data communication is described in U.S. Pat. No. 7,040,435 to Watanabe et al. ("the '435 patent"). The apparatus described in the '435 patent includes a plurality of electronic subsystems, each using a different data communication medium and protocol. The apparatus includes a communication protocol converter configured to convert a first communication protocol associated with a first electronic subsystem to a first communication protocol associated with a second electronic subsystem. After the protocol conversion, data transmitted in different communication media can be transmitted among the plurality of electronic subsystems Although the apparatus described in the '435 patent may be effective for communicating data in a vehicle, it may be problematic. For example, both information and signal data are communicated within each electronic subsystem described in the '435 patent. Although the apparatus disclosed in the '435 patent makes data communication compatible among the several electronic subsystems, the communication of information and signal data within each electronic subsystem still share the same communication protocol. As a result, the vehicle data communication system of the '435 patent may not be capable of achieving high communication performance for both information and signal data. Furthermore, since the data communication system described in the '435 patent uses monolithic design within each electronic subsystem, significant application and communication configuration rewrite will be needed once the physical communication medium is changed.

The disclosed system and method for separating information and signal communications are directed towards overcoming one or more of the shortcomings set forth above.

SUMMARY

In one aspect, a communication system is disclosed for communicating data among a plurality of electronic modules. The communication system may include a data type classifier configured to separate the data into information-type data and signal-type data. The communication system may further include a first communication stack configured to communicate the information-type data among the plurality of electronic modules. The communication system may also include a second communication stack configured to communicate the signal-type data among the plurality of electronic modules. The first communication stack and the second communication stack may share a physical data link.

In another aspect, a method is disclosed for communicating data among a plurality of electronic modules. The method may include separating the data into information-type data or signal-type data. The method may further include communicating the information-type data with a first communication stack among the plurality of electronic modules. The method may also include communicating the signal-type data with a second communication stack among a plurality of electronic modules. The first communication stack and the second communication stack may share a physical data link.

DETAILED DESCRIPTION

Figure 1:
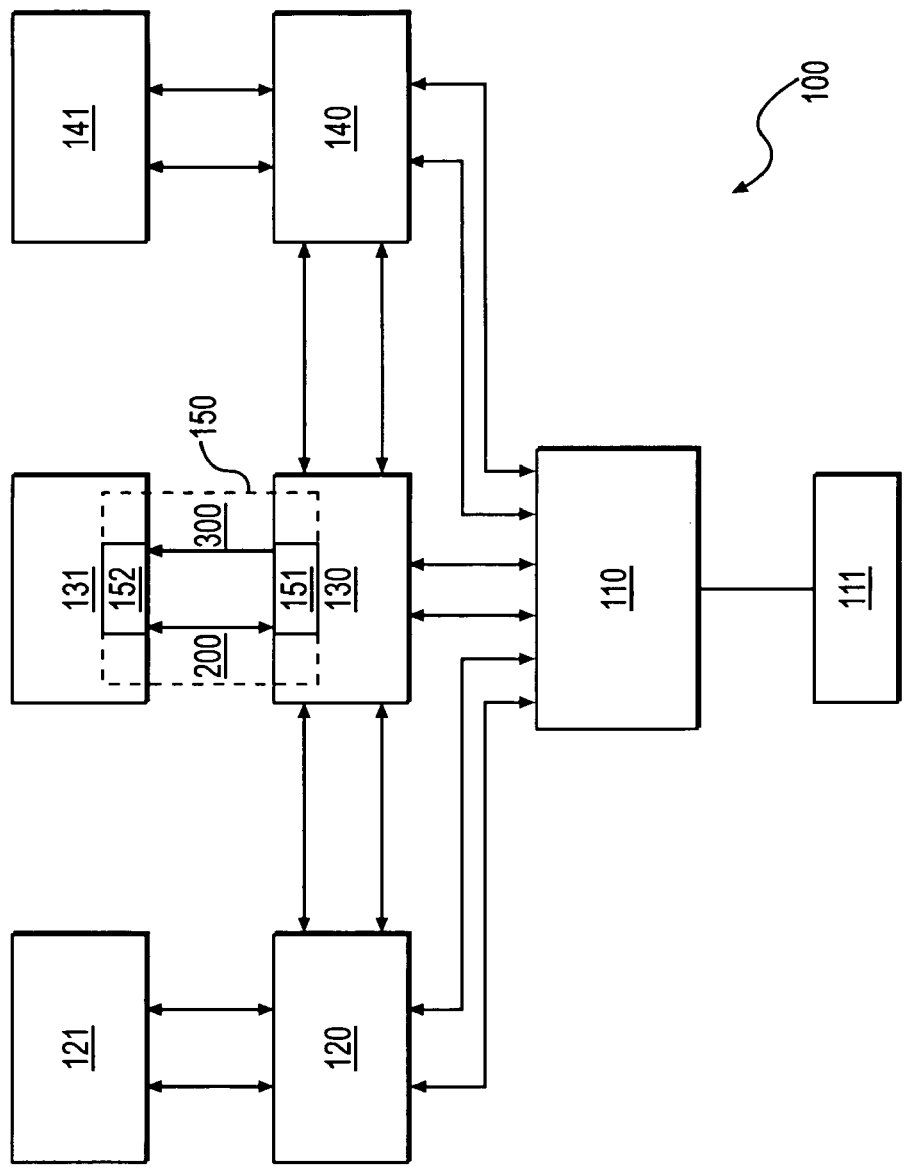
FIG. 1 illustrates an exemplary machine including a plurality of electronic modules and a communication system for communicating data among the electronic modules, according to a disclosed embodiment.

FIG. 1 illustrates an exemplary machine 100 including a plurality of electronic modules and a communication system 150 for communicating data among the electronic modules, according to a disclosed embodiment. Machine, as the term is used herein, refers to a fixed or mobile machine that may perform some type of operation associated with a particular industry, such as mining, construction, farming, etc., that operates between or within work environments (e.g., a construction site, mine site, power plant, etc.) A non-limiting example of a fixed machine includes an engine system operating in a plant or off-shore environment (e.g., off-shore drilling platform). A non-limiting example of a mobile machine includes any commercial machine, such as a truck, crane, earth moving vehicle, mining vehicle, backhoe, material handling equipment, farming equipment, or an on-highway vehicle. It is contemplated that machine 100 illustrated in FIG. 1 may include any type of machine.

Machine 100 may include one or more electronic modules and monitoring devices that cooperate to control and/or monitor operations associated with machine 100. For instance, machine 100 may include, among other things, a main electronic control unit (ECU) 110, one or more distributed ECUs 120, 130, and 140, and one or more monitoring devices 121, 131, and 141. It is contemplated that machine 100 may include additional and/or different components than those listed above.

Distributed ECUs 120, 130 and 140 may be each configured to monitor and/or control an operation associated with one or more components of machine 100. For example, distributed ECUs 120, 130 and 140 may each receive data indicative of operational characteristics associated with a particular component collected by one or more monitoring devices 121, 131, and 141, during an operation of machine 100.

For example, distributed ECU 120 and monitoring device 121 may be associated with an internal combustion engine of machine 100. In particular, monitoring device 121 may be operable to monitor an exhaust pressure of the engine, a flow rate or temperature of fluid flowing through the cooling system of the engine, an air/fuel mixture supplied to a combustion chamber, a gas sensor of an exhaust system of the engine, or any other function of the internal combustion engine. The parameters monitored and collected by monitoring device 121 may be continuously sent to distributed ECU 120. Distributed ECU 120 may consider the parameters collectively and determine if the operation of the engine is normal. In case any malfunction is indicated by the parameters, distributed ECU 120 may derive appropriate control parameters to adjust the engine operation and correct the malfunction.

In some embodiments, distributed ECU 130 and monitoring device 131 may be associated with a regeneration system of machine 100. For example, monitoring device 131 may be a particulate sensor associated with a particulate trap, a regenerative element associated with a particular filter, an exhaust flow sensor associated with the exhaust system, or any other aspect associated with the regeneration system. The parameters monitored and collected by monitoring device 131 may be passed on to distributed ECU 130. Distributed ECU 130 may determine operation status of the regeneration system based on the parameters collected. Distributed ECU 130 may also derive appropriate control parameters to adjust the regeneration system when necessary.

In some embodiments, distributed ECU 140 and monitoring device 141 may be associated with a cooling system of machine 100. For example, monitoring device 141 may be a pressure sensor configured to monitor the coolant pressure in the cooling system. Based on the sensed pressure, distributed ECU 140 may be operable to control a constant pressure valve for maintaining the coolant pressure. In some embodiments, monitoring device 141 may also be a displacement sensor of a hydraulic pump, a temperature sensor configured to monitor the coolant temperature, or a viscosity sensor configured to measure the viscosity of the coolant flowing through the cooling system. Accordingly, distributed ECU 140 may receive the sensor measurements from monitoring device 141, and provide control instructions to adjust the operation of the respective component.

It is contemplated that distributed ECUs 120, 130 and 140 may be any other ECUs that perform particular controlling functions for one or more components of machine 100. Non-limiting examples of distributed ECUs 120-140 may include an engine common ECU, a front engine ECU, a rear engine ECU, an implementation ECU, a road analysis ECU, a chassis ECU, a transmission ECU, a brake ECU, and a display ECU. Besides communicating with their respective monitoring devices 121, 131 and 141, each of distributed ECUs 120, 130 and 140 may communicate with main ECU 10. For example, distributed ECUs 120, 130 and 140 may send data collected by monitoring devices 121, 131, and 141 to main ECU 110. As another example, distributed ECUs 120, 130 and 140 may send their configuration data files to main ECU 110.

Main ECU 110 may be configured to control the integrated operation of machine 100. For example, main ECU 110 may be configured to monitor and coordinate the operation of several components of machine 100, such that machine 100 as a whole may perform functions requested by the operator. In some embodiments, main ECU 110 may communicate with distributed ECUs 120, 130, and 140 to collect data and send control instructions. For example, main ECU 110 may determine control parameters for the engine, the regeneration system and the cooling system of machine 100, in order to achieve an overall speed of 50 miles per hour requested by the operator. Main ECU 110 may send the control parameters to the corresponding distributed ECU 120, 130, or 140, which may adjust its control signals to the respective component. As another example, main ECU 110 may synchronize the configurations of distributed ECU 120, 130, or 140 by sending synchronized configuration data files to the respective ECU.

In some embodiments, main ECU 110 may be connected to an user input interface 111 for receiving instructions from an operator of machine 100. For example, the operator may use user input interface 111 to initiate or terminate data communication.

Main ECU 110, distributed ECUs 120, 130, and 140 and monitoring devices 121, 131, and 141 may be in communication with each other via a communication system 150. For example, a data link such as a Controller Area Network (CAN) and/or a FlexRay may be used for communication system 150. In some embodiments, the CAN data link may use an RS 485 250k cable, and a FlexRay data link may use a FlexRay 2M cable. It is also contemplated that any other type of media suitable for data transmission may also be used in communication system 150 between the ECUs and monitoring devices.

Communication system 150 may connect two electronic devices in machine 100 and be configured to facilitate the communication between the two connected devices. Consistent with the embodiment shown in FIG. 1, communication system 150 may facilitate the communication between distributed ECU 130 and monitoring device 131. It is contemplated that communication system 150 may facilitate communication between any two ECUs or an ECU and a monitoring device.

As described above, various types of data may be communicated between distributed ECU 130 and monitoring device 131. In some embodiments, the first type of data that is communicated may be information-type data, such as configuration files, flash files, diagnostic data files, event log files, control parameter files, password exchange data, etc. The second type of data that is communicated may be signal-type data, such as real-time signals and parameters monitored by monitoring device 131. Examples of these signals may include, but not limited to, actual engine speed, operational status/mode, throttle position, actual gear position, head lamp command, or wiper motor command. In some embodiments, the signal-type data may also include control signals that are generated by distributed ECU 130, such as desired engine speed, desired gear position, and power electronics switching pulses, etc.

Information-type data is usually communicated discretely and asynchronously, for example, upon request or upon a triggering event. In some embodiments, a diagnostic data file may be requested and transferred when a malfunction occurs in a certain component. The information-type data to be communicated is often large in size. Therefore, the communication of information-type data will usually involve complex protocols and networks with multi segments. For example, the data files may be divided into multiple packets and the multiple packets may be sent via different transmitting routes. Furthermore, the accuracy of the communication is often critical. For example, if a packet is lost in the communication, the original data file cannot be reconstructed on the receiving side. Consequently, portability and scalability become two important factors for communicating information-type data in machine 100.

Compared to information-type data, signal-type data is usually communicated continuously or periodically. For example, the engine speed may be continuously measured by a monitoring device and reported to the associated ECU. Unlike information-type data, the data size at a given time may be relatively small. Therefore, the communication of signal-type data will usually involve simple protocols and a local network segment. The data may be sent as a single packet via a single communication route. For signal-type data, real-time communication may be important, and thus, communication performance become a preferred factor. For example, latency may be kept to a minimum in signal-type data communication. Due to the different characteristics of information-type data and signal-type data, as well as their different communication preference, there is a need to communicate the two types of data in separate communication stacks.

Consistent with the present disclosure, communication system 150 may include, among other things, data type classifiers 151 and 152, an information communication stack 200, and a signal communication stack 300. Data type classifiers 151 and 152 may be configured to separate the communication data into information-type data and signal-type data. In some embodiments, communication data may be classified into two types based on the data size. In some other embodiments, communication data may be classified into two types based on the frequency of the data transfer. Data type classifiers 151 and 152, as shown in FIG. 1, may be located in distributed ECU 130 and monitoring device 131 respectively. For example, once a data file is requested from distributed ECU 130 by monitoring device 131, data type classifier 151 may determine that the data to be communicated is information-type data. As another example, when engine speed measured by monitoring device 131 is to be transferred to distributed ECU 130, data type classifier 152 may determine that the data is signal-type data.

Information communication stack 200 may be configured to communicate the information-type data. In some embodiments, information communication stack 200 may include multiple layers designed to enhance portability and scalability. For example, information communication stack 200 may include an application layer 210, a presentation layer 220, a session layer 230, a transportation layer 240, a network layer 250, an information data link layer 260, and a physical layer 270. These layers will be described in greater detail in connection with FIG. 2. By using the multiple layers, information communication stack 200 may abstract out the higher level layers from the lower level layers. For example, information communication stack 200 may use different communication protocols, such as FTP and HTTP, for transferring a data file, without affecting the data link or physical media used for communication.

Signal communication stack 300 may be configured to communicate the signal-type data. Signal communication stack 300 may be designed to enhance communication performance. For example, signal communication stack 300 may be designed to take advantage of the hardware capability as much as possible. In some embodiments, signal communication stack 300 may also include several layers, such as a signal communication configuration layer 310, a signal data link layer 320, and a physical layer 330. These layers will be described in greater detail in connection with FIG. 3.

Consistent with the present disclosure, information communication stack 200 and signal communication stack 300 may share a same physical data link. For example, physical layer 270 and physical layer 330 may be the same physical layer that is shared by both stacks. Both stacks and their corresponding layers may run harmoniously on the same physical data link, such as a RS 485 250K cable 271 and/or a FlexRay 2M cable 272.

Figure 2:
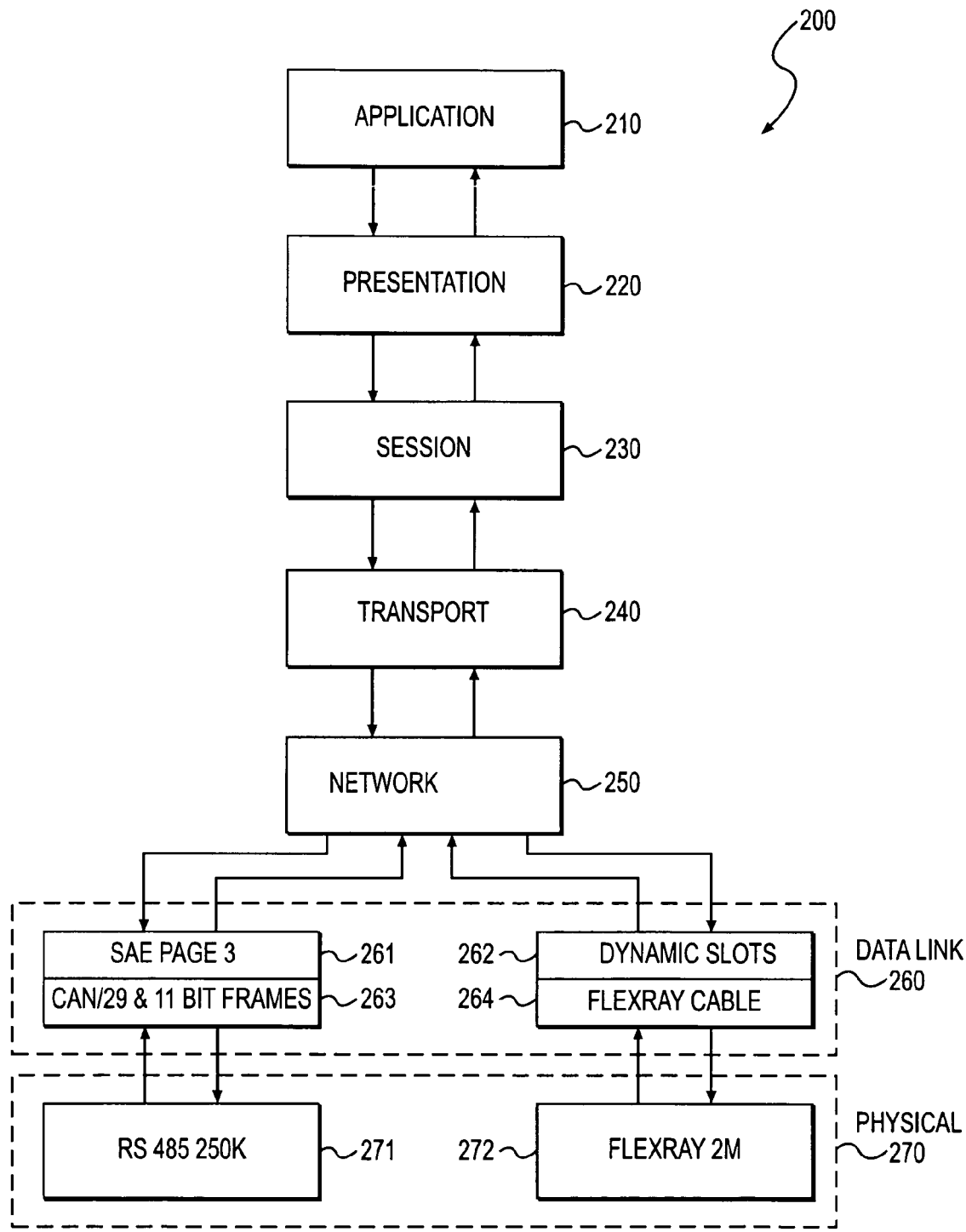
FIG. 2 illustrates an exemplary information communication stack according to a disclosed embodiment.

FIG. 2 illustrates an exemplary information communication stack 200 according to a disclosed embodiment. As shown in FIG. 2, information communication stack 200, among other things, may include an application layer 210, a presentation layer 220, a session layer 230, a transport layer 240, a network layer 250, an information data link layer 260, and a physical layer 270. It is contemplated that information communication stack 200 may include fewer layers or additional layers.

Application layer 210 may perform application services related to an user-defined application process. In some embodiments, application layer 210 may be configured to define at least one communication protocol for communicating the information-type data. For example, application layer 210 may define data transfer protocols such as FTP and HTTP. The information communication process may be initiated by operator of machine 100 or by any ECUs associated with machine 100. For example, the information communication may be dynamically initialized and stopped during normal system operation. In some embodiments, application layer 210 may be connected to user input interface 111 or an input and output interface of distributed ECU 130 to receive instructions about starting and stopping the data transfer. In some embodiments, application layer 210 may also issue requests to presentation layer 220. The information-type data may move from application layer 210 down to presentation layer 220.

Presentation layer 220 may be connected to application layer 210, and configured to perform language and data representation. Consistent with some embodiments, presentation layer 220 may establish a context between application layer entities. Application layer entities may use different syntax and semantics, which may not be directly understandable to each other. Presentation layer 220 may understand these different syntax and semantics and perform a scheme to map/translate between them. In some embodiments, presentation layer 220 may encapsulate the information-type data into session protocol data units. After encryption, presentation layer 220 may send the encrypted data down to session layer 230.

Session layer 230 may be connected to presentation layer 220 and configured to manage a connection between a transmitting electronic module and a receiving electronic module. For example, session layer 230 may establish, recover and terminate a connection between distributed ECU 130 and monitoring device 131. In order to establish a connection, session layer 230 may first find out the presence of a transmitting electronic module and a receiving electronic module. For example, session layer 230 may locate distributed ECU 130 as the transmitting electronic module and monitoring device 131 as the receiving electronic module. Session layer 230 may then establish a connection between the two electronic modules. In some embodiments, session layer 230 may send a heartbeat message from the transmitting electronic module to the receiving electronic module and the connection may be established when the heartbeat message is returned from the receiving electronic module to the transmitting electronic module. Session layer 230 may also periodically send the heartbeat message throughout the communication to ensure that the modules are connected. In some embodiments, communication will be discontinued if the connection is broken, and the connection may be re-covered by session layer 230.

Transport layer 240 may be connected to session layer 230 and be configured to manage multiple packets and end-to-end transfer. In some embodiment, the information data block can be larger than the maximum packet size that may fit in the data link. Therefore, transport layer 240 may be configured to divide the information-type data into a plurality of packets. In some embodiments, transport layer 240 may further provide logical source and destination connection points beyond network node addresses. The connection points may be statically or dynamically established. Transport layer 240 may include certain end-to-end transfer protocols, such as Transmission Control Protocol (TCP) and User Datagram Protocol (UDP). Some protocols may be state and connection oriented. In some embodiments, transport layer 240 may keep track of the packets and re-transmit those that fail. The multiple packets segmented by transport layer 240 may be passed down to network layer 250.

Network layer 250 may be connected to transport layer 240 and configured to determine a transmitting route for each packet. During the communication, a packet may be moved across multiple data link segments, instead of being bound to a single data link segment. Consistent with some embodiments, network layer 250 may provide the functional and procedural means of transferring variable length data sequences from a source to a destination via data link segments. Network layer 250 may include multiple routers to send data throughout the extended network. Routing protocols such as Internet Protocol (IP) may be used to mange the connectionless transfer of data from end system to ingress router, from router to router, and from egress router to destination end system. A transmitting router between distributed ECU 130 and monitoring device 131 may be determined for each packet. The packets with their respective routing information such as the involved routers may be passed on from network layer 250 to information data link layer 260.

Information data link layer 260 may be connected to network layer 250. In some embodiments, information data link layer 260 may include a framing sub-layer and a data link sub-layer. The data link sub-layer may include data link buses such as CAN and FlexRay, and the framing sub-layer may include corresponding bus standards. In some embodiments, the framing sub-layer may be configured to structure each packet into a plurality of frames according to a framing standard associated with the data link sub-layer. For example, the data link sub-layer may use a CAN/29 & 11 bit frames bus 263, and accordingly, the framing sub-layer may use a SAE page 3 framing standard 261. As another example, the data link sub-layer may use a FlexRay bus 264, and accordingly, the framing sub-layer may use a dynamic slots framing standard 262. The framing sub-layer may segment the data in a packet into multiple frames and add header information such as a data identifier to each frame. Information data link layer 260 may send the frames down to physical layer 270.

Physical layer 270 may be connected to information data link layer 260. In some embodiments, physical layer 270 may include one or more transmission media, such as, Wireless, Shielded Twisted Pair (STP) cable, Unshielded Twisted-Pair (UTP) cable, Coaxial cable (Coax), Fiber Optic, etc. For example, physical layer 270 may include a RS 485 250K cable 271 and/or a FlexRay 2M cable 272. Physical layer 270 may be configured to transmit the frames structured in information data link layer 260, from the transmitting electronic module to the receiving electronic module. In some embodiments, the frames may be transmitted according to the transmitting route associated with the corresponding packet, as determined by network layer 250.

In some embodiments, physical layer 270 may be upgraded, for example, from a RS 485 250K cable to a FlexRay 2M cable. Accordingly, information data link layer 260 may be updated to comply with the new physical media. However, due to the leveled structure of information communication stack 200, layers 210-250 are abstracted out from the lower layers, and thus they may function with the new physical media without further changes.

Figure 3:
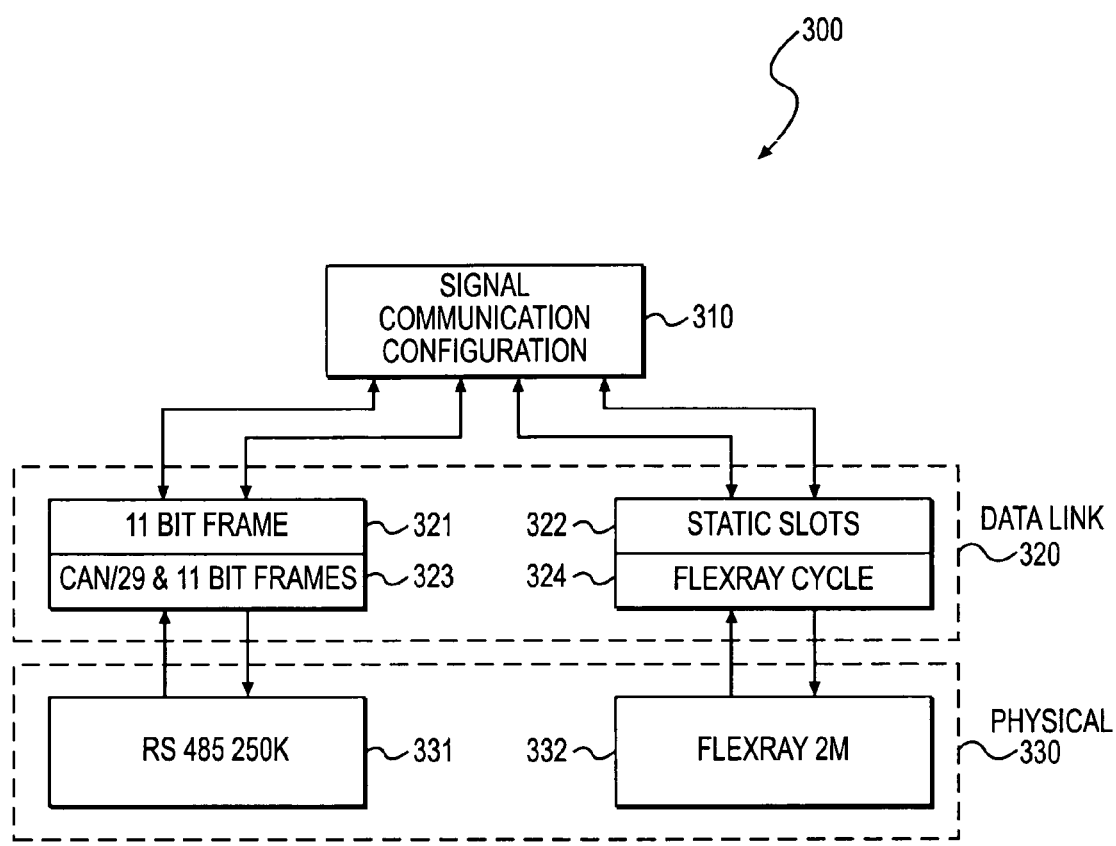
FIG. 3 illustrates an exemplary signal communication stack according to a disclosed embodiment.

FIG. 3 illustrates an exemplary signal communication stack 300 according to a disclosed embodiment. Compared to information communication stack 200, signal communication stack 300 may include relatively fewer layers, in order to emphasize hardware performance. For example, as shown in FIG. 3, signal communication stack 300, among other things, may include a signal communication configuration layer 310, a signal data link layer 320, and a physical layer 330. It is contemplated that signal communication stack 300 may include fewer or additional layers.

Similar to application layer 210, signal communication configuration layer 310 may configure and perform various types of application services. For example, signal communication configuration layer 310 may define at least one communication protocol for communicating the signal-type data. For example, signal communication configuration layer 310 may define data transfer protocols such as a simple broadcast protocol. However, unlike information communication applications that are usually user-initiated, signal communication applications are typically initiated at system start. For example, engine speed may be monitored and transmitted from monitoring device 121 continuously once machine 100 is turned on. Therefore, signal communication may be statically configured during software build time or dynamically configured at system start.

In some embodiments, configuration of signal communication may include setting up the connection for the communication. For example, signal communication configuration layer 310 may use interfaces and protocols associated with application layer 210 to set up signal communication. Unlike information communication, signal communication does not check for the presence of the receiving electronic module. Furthermore, signal communication does not divide the signal data into packets. Rather, signal data may be limited to the maximum packet size of signal data link layer 320 to maximize efficiency. In addition, no transmit routing has to be determined for each signal data, as the receiving electronic module is usually connected on the same data link as the transmitting electronic module. The signal data may move from signal communication configuration layer 310 down to signal data link layer 320.

Signal data link layer 320 may be connected to signal communication configuration layer 310. Similar to information data link layer 260, signal data link layer 320 may include a framing sub-layer and a data link sub-layer. The data link sub-layer may include data link buses such as CAN and FlexRay, and the framing sub-layer may include corresponding bus standards. In some embodiments, the framing sub-layer may be configured to structure each signal data into a plurality of frames according to a framing standard associated with the data link sub-layer. For example, the data link sub-layer may use a CAN/29 & 11 bit frames bus 323, and accordingly, the framing sub-layer may use a 11 bit framing standard 321. As another example, the data link sub-layer may use a FlexRay cable bus 324, and accordingly, the framing sub-layer may use a static slots framing standard 322. Similar to the framing sub-layers in information data link layer 260, the framing sub-layers in signal data link layer 320 may segment the signal data into multiple frames and add header information such as a data identifier to each frame. Signal data link layer 320 may send the frames down to physical layer 330.

Similar to physical layer 270, physical layer 330 may include one or more transmission media, such as, Wireless, Shielded Twisted Pair (STP) cable, Unshielded Twisted-Pair (UTP) cable, Coaxial cable (Coax), Fiber Optic, etc. For example, physical layer 330 may include a RS 485 250K cable 331 and/or a FlexRay 2M cable 332. Physical layer 330 may be configured to transmit the frames structured in signal data link layer 320, from the transmitting electronic module to the receiving electronic module.

In some embodiments consistent with the present disclosure, information communication stack 200 and signal communication stack 300 may share the same physical layer 270 (or physical layer 330). Frames structured in information data link layer 260 and signal data link layer 320 may be indifferent to physical layer 270 for transmitting purpose.

INDUSTRIAL APPLICABILITY

Figure 4:
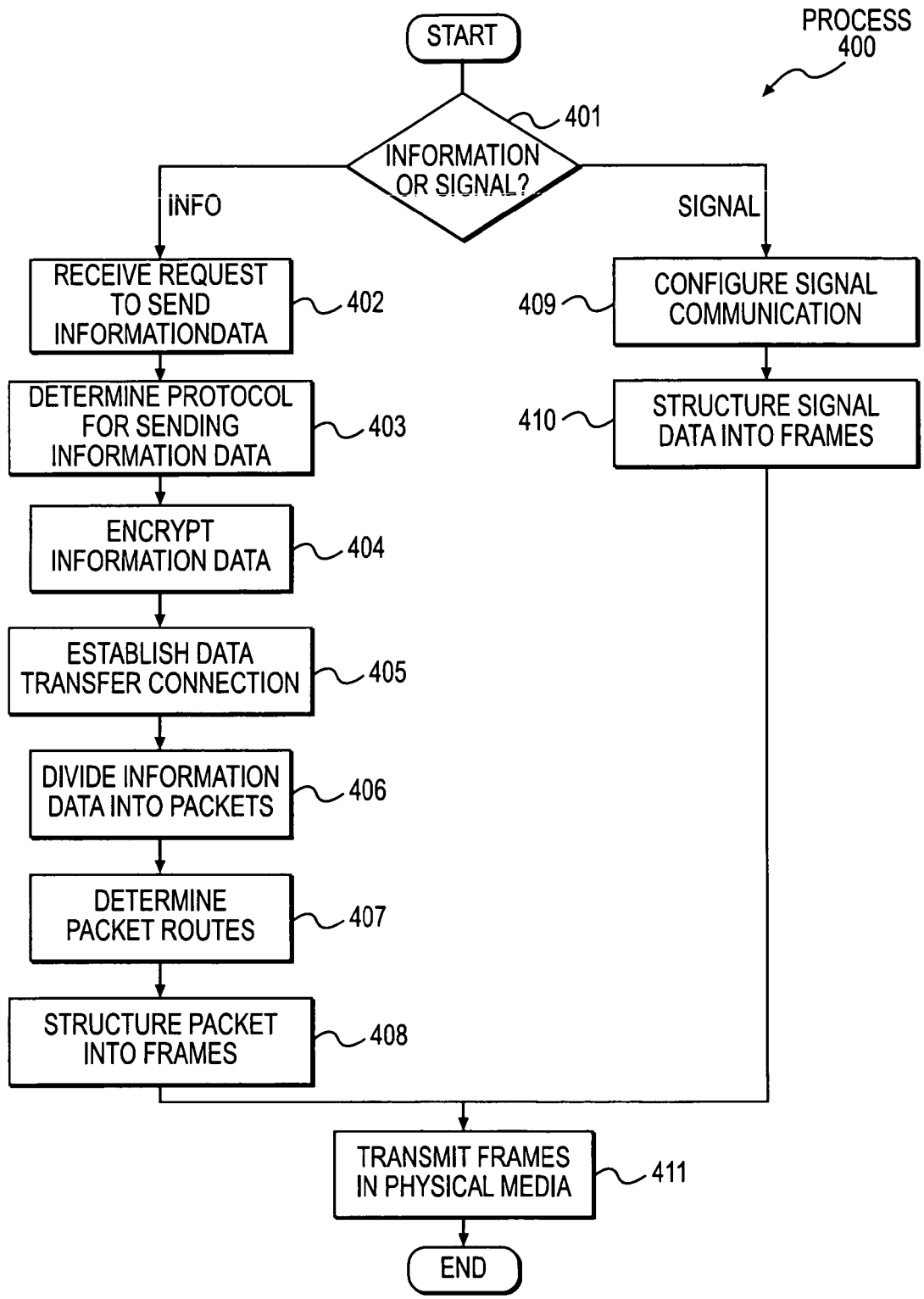
FIG. 4 illustrates a flowchart depicting an exemplary disclosed data transmitting process, consistent with the embodiments disclosed in FIG. 2 and FIG. 3.

Although the disclosed embodiments are described in association with machine 100 for separating information and signal communications between ECUs and monitoring devices on machine 100, the disclosed communication system 150 may be used in any apparatus or system where both information-type data and signal type data are being communicated between a plurality of electronic modules. Specifically, the disclosed a communication system 150 may include one or more data type classifiers 151 and 152 configured to separate the data into information-type data and signal-type data. The communication system may further include a information communication stack 200 configured to communicate the information-type data between the plurality of electronic modules. The communication system may also include a signal communication stack 300 configured to communicate the signal-type data between the plurality of electronic modules. Consistent with the present disclosure, information communication stack 300 and signal communication stack 300 may share a physical data link FIG. 4 illustrates a flowchart depicting an exemplary disclosed data transmitting process 400 using the disclosed communication system 150, consistent with the embodiment disclosed in FIG. 2 and FIG. 3. Data transmitting process 400 may begin when the data is identified by data type classifier 151/152 as information-type data or signal-type data (Step 401). For example, a configuration data file may be identified as information-type data. Data type classifier 151/152 may direct the identified data to the respective communication stacks designed for communicating information-type data and signal-type data respectively. For example, information-type data may be designated to information communication stack 200, and go through a communication process that includes steps 402-408. On the other hand, signal-type data may be may be designated to signal communication stack 300, and go through a communication process that includes steps 409-410.

In step 402, a request to transmit the information-type data may be received by application layer 210. In some embodiments, data transmitting may be initiated by a user via the application tools in application layer 210. In some other embodiments, data transmitting may be initiated by an ECU requesting the data from another ECU or a monitoring device. For example main ECU 110 may request the data from distributed ECU 120. After the information data transmitting is requested, one or more high level protocols may be determined to transmit the data (Step 403). For example, application layer 210 may define data transfer protocols such as FTP and HTTP. Application layer 210 data may send the data down to presentation layer 220.

In step 404, the data may be encrypted at presentation layer 220. For example, presentation layer 220 may perform language and data representation. In some embodiments, application layer 210 may include higher-layer entities that use different syntax and semantics. Presentation layer 220 establish a context between application layer entities, and map between the different syntax and semantics. Presentation layer 220 may send the encrypted data down to session layer 230.

In step 405, session layer 230 may establish a data transmitting connection between the transmitting electronic module and the receiving electronic module. For example, session layer 230 may first find out the presence of a transmitting electronic module (e.g., distributed ECU 130) and a receiving electronic module (e.g., monitoring device 131). Session layer 230 may then establish a connection between the two electronic modules. In some embodiments, session layer 230 may send a heartbeat message from the transmitting electronic module to the receiving electronic module and the connection may be established when the heartbeat message is returned from the receiving electronic module to the transmitting electronic module. The connection information may be attached to the data and the data may be sent down from session layer 230 to transport layer 240.

In some embodiments, the information data block may be larger than the maximum packet size that may fit in information data link layer 260. Therefore, at transport layer 240, the data may be divided into multiple packets (Step 406). In some embodiments, one or more end-to-end transfer protocols may also be determined in transport layer 240, such as Transmission Control Protocol (TCP) and User Datagram Protocol (UDP). The multiple packets segmented by transport layer 240 may be passed down to network layer 250.

A transmitting route for each packet may be determined in network layer 250 (Step 407). Consistent with some embodiments, network layer 250 may provide a means of transferring the packets from the transmitting electronic module to the receiving electronic module via multiple data link segments. Network layer 250 may include multiple routers and may use routing protocols such as Internet Protocol (IP) to mange the transfer of data. The routing information such as the involved routers may be attached to the data, and the data may be passed on from network layer 250 to information data link layer 260.

In step 408, each packet may be structured into one or more frames in information data link layer 260. In some embodiments, the frames may be structured according to a framing standard associated with the data link used for communicating the information-type data. For example, a SAE page 3 framing standard may be used for a CAN/29 & 11 bit frames data link. In some embodiments, each frame may include several fields, such as a start-of-frame, an identifier, a control field, a data field, an ACK slot, and an end-of frame. The packet may be segmented and distributed into the data fields of multiple frames. The structured frames may be ready for transmission in a physical medium.

Consistent with some embodiments, information data link layer 260 may include a plurality of data link buses each corresponding to a communication medium in physical layer 270. For example, both a CAN/29 & 11 bit frames data link and a FlexRay data link may be used in information data link layer 260, corresponding to a RS 485 250K cable and a FlexRay 2M cable used in physical layer 270. Accordingly, in step 408, the communication medium used for transmitting the current packet may be identified. The data link bus corresponding to the identified communication medium may also be identified. For example, if RS 485 250K cable is used as the communication medium, CAN/29 & 11 bit frames data link may be identified as the corresponding data link bus. The frames may be structured according to a framing standard associated with the identified data link bus. For example, a SAE page 3 framing standard may be used corresponding to the CAN/29 & 11 bit frames data link.

The communication of signal-type data may go through steps 409 and 410. In step 409, signal communication may be configured, for example, by signal communication configuration layer 310. For example, signal communication configuration layer 310 may define at least one communication protocol, such as, data transfer protocols such as a simple broadcast protocol. In some embodiments, signal communication may be statically configured during software build time or dynamically configured at system start. Configuration of signal communication may include setting up the connection for the communication. Since for signal communication the receiving electronic module is usually connected on the same data link as the transmitting electronic module, a single transmitting route will be used for every signal data. The signal data may move from signal communication configuration layer 310 down to signal data link layer 320.

In step 410, each packet may be structured into one or more frames in signal communication configuration layer 310. In some embodiments, the frames may be structured according to a framing standard associated with the data link. For example, a 11 bit framing standard may be used for a CAN/29 & 11 bit frames data link. Similar to the frames structured in step 408, the frames structured in signal data link layer 320 may include multiple fields. In particular, for the 11 bit framing standard, the identifier may be 11 bits in length. The structured frames may be ready for transmission in a physical medium.

Similar to information data link layer 260, signal data link layer 320 may include a plurality of data link buses each corresponding to a communication medium in physical layer 330. Accordingly, in step 410, the communication medium used for transmitting the current signal data may be identified. The data link bus corresponding to the identified communication medium may also be identified. For example, if FlexRay 2M cable is used as the communication medium, FlexRay data link may be identified as the corresponding data link bus. The frames may be structured according to a framing standard associated with the identified data link bus. For example, a static slot framing standard may be used corresponding to the FlexRay data link.

Both the frames of information-type data and frames of signal-type data may be transmitted in a physical medium (Step 411). For example, the frames may be transmitted via physical layer 270 or physical layer 330. The physical layer may include one or more transmission media, such as, Wireless, Shielded Twisted Pair (STP) cable, Unshielded Twisted-Pair (UTP) cable, Coaxial cable (Coax), Fiber Optic, etc. The physical layer may transmit the frames from the transmitting electronic module to the receiving electronic module. For information-type data, the frames may be transmitted according to the transmitting route associated with the corresponding packet, as determined in step 407. Data transmitting process 400 may then conclude.

The disclosed communication system 150 and data transmitting process 400 may effectively communicate both information-type and signal-type data in machine 100 or any other systems alike. The disclosed system and method separates the communication of information and signal data into two communication stacks, each designed to maximize different communication preferences. For example, information communication may favor portability and scalability, and signal communication may favor maximum hardware performance and real-time capability. As a result, high communication performance for both information and signal data may be achieved. Furthermore, since the disclosed system and method uses layered structure for both communication stacks, higher level application and communication configuration rewrite will be reduced or avoided when the physical communication medium is upgraded.

It will be apparent to those skilled in the art that various modifications and variations can be made to the disclosed communication system 150 and data transmitting process 400 without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A communication system for communicating data among a plurality of electronic modules, comprising:
   a data type classifier configured to separate data into information-type data and signal-type data, the data type classifier receiving data from at least one sensor and being configured to separate the data from the at least one sensor as signal-type data;
   a first communication stack configured to communicate the information-type data among the plurality of electronic modules; and
   a second communication stack configured to communicate the signal-type data among the plurality of electronic modules,
   wherein the first communication stack and the second communication stack share a physical data link.

2. The communication system of claim 1, wherein the first communication stack and the second communication stack each include a plurality of layers.

3. The communication system of claim 1, wherein the data type classifier is configured to separate as information-type data at least one of a configuration file, a flash file, a diagnostic data file, an event log file, a control parameter file, and password exchange data.

4. The communication system of claim 2, wherein the first communication stack includes:

an application layer configured to define at least one communication protocol for communicating the information-type data;
a session layer connected to the application layer and configured to manage a connection between a transmitting electronic module and a receiving electronic module;
a transport layer connected to the session layer and configured to divide the information-type data into a plurality of packets;
a network layer connected to the transport layer and configured to determine a transmitting route for each packet;
an information data link layer connected to the network layer and configured to structure each packet into a plurality of frames according to a first framing standard; and
a physical communication layer connected to the information data link layer and configured to transmit the plurality of frames between the transmitting electronic module and the receiving electronic module according to the transmitting route associated with the corresponding packet.

5. The communication system of claim 2, wherein the second communication stack includes:
a signal communication configuration layer configured to:
define at least one communication protocol for communicating the signal-type data; and
set up a single communication route between a transmitting electronic module and a receiving electronic module;
a signal data link layer connected to the signal communication configuration layer and configured to structure each signal-type data into a plurality of frames according to a second framing standard; and
a physical communication layer connected to the signal data link layer and configured to transmit the plurality of frames between the transmitting electronic module and the receiving electronic module according to the single communication route.

6. The communication system of claim 4, wherein the first communication stack further includes a presentation layer between the application layer and the session layer, wherein the presentation layer is configured to encrypt the information-type data.

7. The communication system of claim 4, wherein the physical communication layer includes a plurality of communication media and the information data link layer further includes a plurality of information data link buses, wherein each information data link bus is associated with a framing standard corresponding to a distinct communication medium.

8. The communication system of claim 4, wherein the information data link layer is associated with a controller area network and wherein the framing standard is a SAE page 3 framing standard.

9. The communication system of claim 4, wherein the information data link layer is associated with a FlexRay and wherein the framing standard is a dynamic slots framing standard.

10. The communication system of claim 4, wherein the signal data link layer is associated with a FlexRay and wherein the framing standard is a static slots framing standard.

11. The communication system of claim 5, wherein the physical communication layer includes a plurality of communication media and the signal data link layer further includes a plurality of signal data link buses, wherein each signal data link bus is associated with a framing standard corresponding to a distinct communication medium.

12. The communication system of claim 5, wherein the signal data link layer is associated with a controller area network and wherein the framing standard is a CAN/11 bit framing standard.

13. A method for communicating data among a plurality of electronic modules, comprising:
separating data into information-type data or signal-type data, including receiving data from at least one sensor and separating the data from the at least one sensor as signal-type data;
communicating the information-type data with a first communication stack among the plurality of electronic modules; and
communicating the signal-type data with a second communication stack among a plurality of electronic modules, wherein the first communication stack and the second communication stack shares a physical data link.

14. The method of claim 13, wherein communicating the information-type data includes:
defining at least one communication protocol for communicating the information-type data;
establishing a connection between a transmitting electronic module and a receiving electronic module;
dividing the information-type data into a plurality of packets;
determining a transmitting route for each packet; and
structuring each packet into a plurality of frames according to a framing standard; and
transmitting the plurality of frames between the transmitting electronic module and the receiving electronic module according to the transmitting route associated with the corresponding packet.

15. The method of claim 13, wherein communicating the signal-type data includes:
defining at least one communication protocol for communicating the signal-type data;
setting up a single communication route between a transmitting electronic module and a receiving electronic module;
structuring each signal-type data into a plurality of frames according to a framing standard; and
transmitting the plurality of frames between the transmitting electronic module and the receiving electronic module according to the single communication route.

16. The method of claim 14, wherein communicating the information-type data further includes encrypting the information-type data.

17. The method of claim 14, wherein the first data link includes a plurality of data link buses each corresponding to a communication medium and wherein structuring each packet into a plurality of frames further includes:
identifying a communication media for transmitting the packet;
identifying a data link bus corresponding to the identified communication medium; and
structuring the packet according to a framing standard associated with the identified data link bus.

18. The method of claim 17, wherein the data link bus is a controller area network and wherein the framing standard is a SAE page 3 framing standard.

19. The method of claim 15, wherein the first data link includes a plurality of data link buses each corresponding to a communication medium and wherein structuring each signal-type data into a plurality of frames further includes:

identifying a communication media for transmitting the signal-type data;

identifying a data link bus corresponding to the identified communication medium; and structuring the signal-type data according to a framing standard associated with the identified data link bus.

20. The method of claim 18, wherein the data link bus is a controller area network and wherein the framing standard is a 11 bit framing standard.

21. A machine, comprising:

a plurality of electronic modules; and a communication system configured to communicate data among the plurality of electronic modules, wherein the communication system includes:

a data type classifier configured to separate data into information-type data and signal-type data, the data classifier receiving data from at least one sensor and being configured to separate the data from the at least one sensor as signal-type data;

a first communication stack configured to transmit the information-type data among the plurality of electronic modules; and a second communication stack configured to transmit the signal-type data among the plurality of electronic modules, wherein the first communication stack and the second communication stack shares a physical data link.

22. A communication system for communicating data among a plurality of electronic modules, comprising:

a data type classifier configured to separate data into information-type data and signal-type data, the data type classifier being configured to separate the data based on at least one of data size and frequency of data transfer;

a first communication stack configured to communicate the information-type data among the plurality of electronic modules; and a second communication stack configured to communicate the signal-type data among the plurality of electronic modules, wherein the first communication stack and the second communication stack share a physical data link.

23. A method for communicating data among a plurality of electronic modules, comprising:

separating data into information-type data or signal-type data, including separating the data based on at least one of data size and frequency of data transfer;

communicating the information-type data with a first communication stack among the plurality of electronic modules; and communicating the signal-type data with a second communication stack among a plurality of electronic modules, wherein the first communication stack and the second communication stack shares a physical data link.

24. A communication system for communicating data among a plurality of electronic modules, comprising:

a data type classifier configured to separate data into information-type data and signal-type data;

a first communication stack configured to communicate the information-type data among the plurality of electronic modules; and a second communication stack configured to communicate the signal-type data among the plurality of electronic modules, wherein the first communication stack and the second communication stack share a physical data link; and wherein the first communication stack includes:

an information data link layer connected to the network layer and configured to structure each packet into a plurality of frames according to a first framing standard; and a physical communication layer connected to the information data link layer and configured to transmit the plurality of frames between the transmitting electronic module and the receiving electronic module according to the transmitting route associated with the corresponding packet.

25. A method for communicating data among a plurality of electronic modules, comprising:

separating data into information-type data or signal-type data;

communicating the information-type data with a first communication stack among the plurality of electronic modules;

communicating the signal-type data with a second communication stack among a plurality of electronic modules; and wherein the first communication stack and the second communication stack shares a physical data link;

wherein communicating the information-type data includes:

dividing the information-type data into a plurality of packets;

determining a transmitting route for each packet; and structuring each packet into a plurality of frames according to a framing standard; and transmitting the plurality of frames between the transmitting electronic module and the receiving electronic module according to the transmitting route associated with the corresponding packet.

* * * * *